(12) United States Patent
Do Valle et al.

(10) Patent No.: US 9,083,199 B2
(45) Date of Patent: Jul. 14, 2015

(54) BATTERY CHARGER CIRCUIT AND CONTROL SCHEMES

(75) Inventors: Bruno Guimaraes Do Valle, Brookline, MA (US); Christian T. Wentz, Cambridge, MA (US); Rahul Sarpeshkar, Arlington, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 1039 days.

(21) Appl. No.: 13/104,188

(22) Filed: May 10, 2011

(65) Prior Publication Data

US 2011/0279079 A1  Nov. 17, 2011

Related U.S. Application Data

(60) Provisional application No. 61/334,403, filed on May 13, 2010.

(51) Int. Cl.
*H02J 7/00* (2006.01)
*H02J 7/04* (2006.01)

(52) U.S. Cl.
CPC ............... *H02J 7/04* (2013.01); *H02J 7/0073* (2013.01)

(58) Field of Classification Search
CPC combination set(s) only.
See application file for complete search history.

(56) References Cited

U.S. PATENT DOCUMENTS

| 5,545,978 | A | * | 8/1996 | Pontius | 323/313 |
| 5,710,506 | A | * | 1/1998 | Broell et al. | 320/145 |
| 5,736,832 | A | * | 4/1998 | Seragnoli | 320/128 |
| 5,936,385 | A | * | 8/1999 | Patillon et al. | 320/136 |
| 6,172,485 | B1 | * | 1/2001 | Fujita et al. | 320/136 |
| 2005/0253560 | A1 | | 11/2005 | Popescu-Stanesti et al. | |
| 2007/0188139 | A1 | * | 8/2007 | Hussain et al. | 320/128 |
| 2008/0197811 | A1 | | 8/2008 | Hartular et al. | |
| 2008/0203974 | A1 | | 8/2008 | Manai et al. | |
| 2009/0295338 | A1 | | 12/2009 | Hawawini et al. | |
| 2010/0079127 | A1 | * | 4/2010 | Grant | 323/285 |
| 2010/0327806 | A1 | * | 12/2010 | Brisebois | 320/116 |
| 2011/0254511 | A1 | * | 10/2011 | Tam | 320/162 |

FOREIGN PATENT DOCUMENTS

JP   2009 225594   10/2009

OTHER PUBLICATIONS

International Preliminary Report on Patentability of the ISA for PCT/US2011/035836 dated Nov. 22, 2012.
Search Report of the ISA for PCT/US2011/035836 dated Nov. 29, 2011.
Written Opinion of the ISA for PCT/US2011/035836 dated Nov. 29, 2011.

* cited by examiner

*Primary Examiner* — Drew A Dunn
*Assistant Examiner* — Steve T Chung
(74) *Attorney, Agent, or Firm* — Daly, Crowley, Mofford & Durkee, LLP

(57) ABSTRACT

Described is a battery charger circuit for charging a battery. The battery charger circuit comprises a control element having a first input configured to receive an input from a reference source, a second input configured to receive an input from the battery and an output, said control element having an output current response characteristic which varies with respect to the battery input such that said control element implements a saturating function that causes the charging current of the battery to automatically transition between a constant current operating mode and a constant voltage operating mode or a constant voltage operating mode to a constant current operating mode.

28 Claims, 11 Drawing Sheets

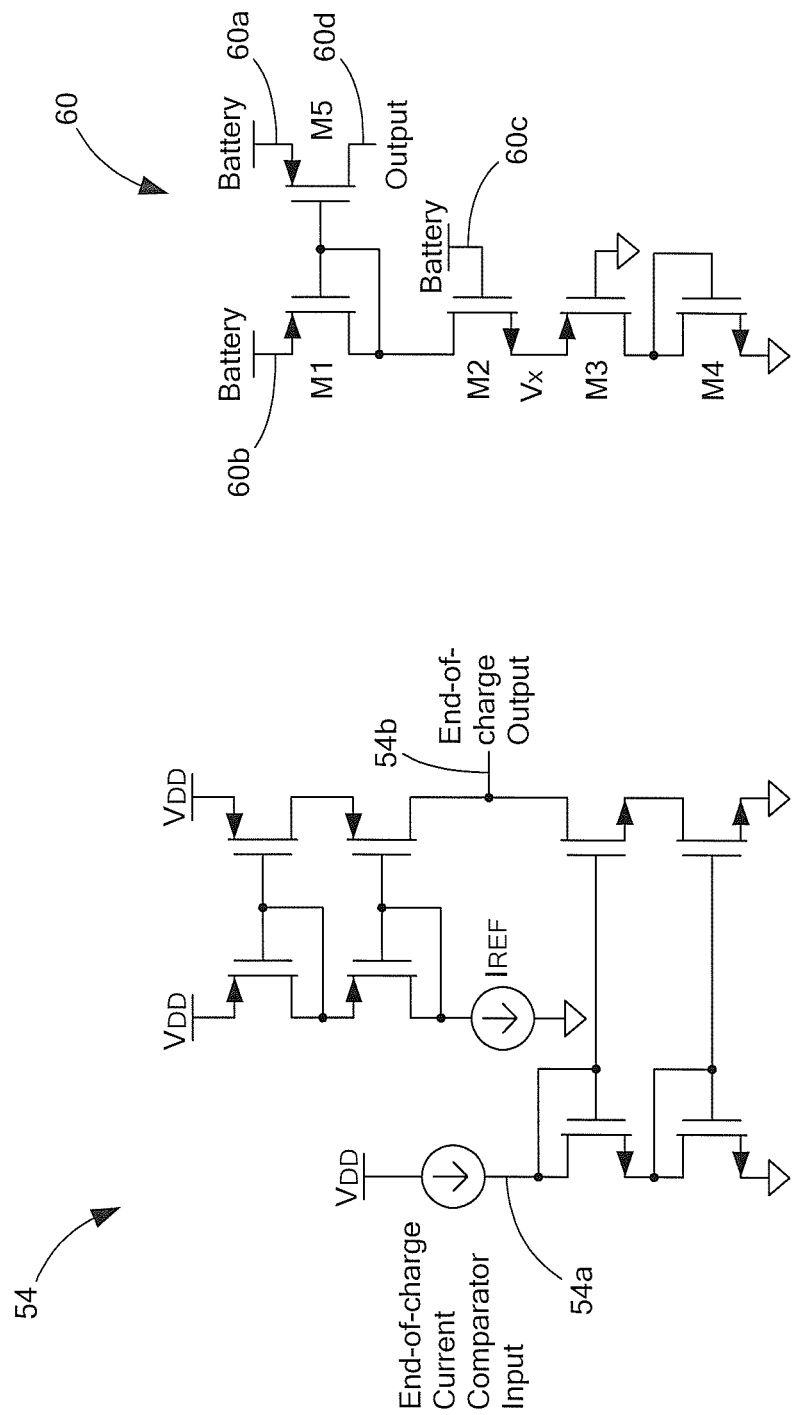

BATTERY CHARGER CIRCUIT AND CONTROL SCHEMES

CROSS REFERENCE TO RELATED APPLICATIONS

This application claims the benefit of U.S. Provisional Application No. 61/334,403 filed May 13, 2010 under 35 U.S.C. §119(e) which application is hereby incorporated herein by reference in its entirety.

GOVERNMENT RIGHTS

This invention was made with Government support under Grant No. R01-NS056140 awarded by the National Institutes of Health and under Grant No. N00014-09-1-1015 awarded by the Office of Naval Research. The Government has certain rights in the invention.

FIELD OF THE INVENTION

The concepts described herein relate to charger circuits, and more particularly to battery charger circuits.

BACKGROUND OF THE INVENTION

As is known in the art, battery longevity is a primary concern in implanted medical devices (also referred to simply as "implants") due to the significant cost and risk of additional surgery required to replace a battery. Battery longevity is, in turn, highly sensitive to the accuracy of the final charging voltage on the battery. Lithium-ion (Li-ion) batteries are a popular choice for implants due to their ability to provide relatively high performance in both energy and power densities, of 158 Wh/Kg and 1300 WlKg, respectively.

As is also known, lithium-ion (Li-ion) batteries have a target voltage of 4.2 volts (V). It has been shown that undercharging a lithium-ion (Li-ion) battery by 1.2% of the 4.2 V target value results in a 9% reduction in battery capacity. Conversely, if a Li-ion battery is overcharged, dangerous thermal runaway can occur. During discharge, deeply discharging the Li-ion battery below 3 V can permanently reduce the cell's capacity.

As is also known, conventional Li-ion charger designs often suffer from two significant problems. First, unnecessarily complex control circuitry is often employed to manage battery charging at the expense of circuit area and power consumption. Second, many charger circuits require a sense resistor to detect end-of-charge. This latter point is particularly problematic for battery longevity due to the challenges of precision on-chip resistor fabrication, as undercharging the battery can drastically reduce its capacity Referring now to FIG. 1, a plot of current and voltage vs. time illustrates a charging profile of a Li-ion battery. Curve 8 corresponds to current and curve 10 corresponds to voltage. As can be seen from FIG. 1, the charging profile can be divided into four distinct regions: a trickle-charge region 12, a constant current region 14, a constant voltage region 16, and an end-of-charge region 18. Trickle charging is required only if the battery is deeply discharged (voltage is less than 3 V). During trickle-charge, the battery is charged with a small amount of current, typically no more than 0.1 times the rated capacity of the battery, or (0.1C) where C represents the battery capacity expressed in terms of amperehours (Ah). Charging currents greater than O.1C may be hazardous as Li-ion batteries typically have a relatively high internal impedance at such low voltages. Above 3.0 V, the battery may be charged at higher currents; this is the constant current region 14. As the battery voltage approaches 4.2 V, the charging profile enters the constant voltage region 16. In this region, the charging current should be progressively decreased as the battery voltage approaches 4.2 V.

The constant voltage region 16 is required in order to compensate for internal battery voltage drop; as the charging current decreases, the battery output voltage also decreases due to lower voltage drop across its internal impedance. Charging current should be decreased until a certain threshold is met, which is usually about 2% of the rated battery capacity. Once this charging current is reached, the charger enters the end-of-charge region 18 in which no current is provided.

SUMMARY OF THE INVENTION

A battery charger circuit for charging a battery includes a control element having a first input configured to receive an input from a reference source, a second input configured to receive an input from the battery and an output. The control element is provided having an output current response characteristic which varies with respect to the battery input such that the control element implements a saturating function that causes the charging current of the battery to automatically transition between one of: a constant current operating mode and a constant voltage operating mode; or a constant voltage operating mode to a constant current operating mode.

In one embodiment, the output current response characteristic of said control element has a shape corresponding to the shape of a hyperbolic tangent function.

In one embodiment, the control element is implemented as a sub-threshold operational transconductance amplifier (OTA) having a first input configured to receive an input from a reference source, a second input configured to receive an input from the battery and an output coupled to an output of the battery charger circuit.

In one embodiment, the control element is implemented as an above-threshold operational transconductance amplifier (OTA) having a first input configured to receive an input from a reference source, a second input configured to receive an input from the battery and an output coupled to an output of the battery charger circuit.

In one embodiment, the battery charger circuit further includes a gain stage having an input coupled to the output of the control element and an output configured to couple to the battery and at which a battery charging current is provided.

In one embodiment, the battery charger circuit further includes an end-of-charge circuit having a first input coupled to the output of the control element and having an output coupled to the gain stage.

In one embodiment, the battery charger circuit further includes a trickle charge circuit.

In one embodiment, the control element is comprises a processor configured to apply a saturation function to signals provided thereto such that the battery charger circuit automatically transitions between one of: a constant current operating mode and a constant voltage operating mode; or a constant voltage operating mode to a constant current operating mode in response to voltage levels of the battery.

In one embodiment, the control element comprises an analog-to-digital converter (ADC) circuit having a first input configured to receive an input from a reference source, a second input configured to receive an input from the battery and an output of the ADC is coupled to a digital controller. The digital controller receives digital signals from the ADC and applies a saturation function to the digital signals such that the battery charger circuit automatically transitions between one of: a constant current operating mode and a constant voltage operating mode; or a constant voltage operating mode to a constant current operating mode in response to the digital signals provided to the digital controller. A digital-to analog converter (DAC) circuit is coupled to an output of the digital controller and provides an analog signal at the output thereof. In one embodiment, the digital controller comprises a digital signal processor (DSP).

In one embodiment, the battery charger circuit further comprises a low-power detector circuit having a plurality of input terminals at which battery voltage signals are provided and an output terminal at which a low-power detector circuit output signal is provided, wherein in response to detecting that a predetermined threshold level is reached, the low-power detector circuit cuts off power to a load.

In accordance with a further aspect of the concepts described herein, a power management integrated circuit (IC) includes a control element having a first input configured to receive an input from a reference source, a second input configured to receive an input from the battery and an output. The control element of the IC has an output current response characteristic which varies with respect to input voltage such that said control element provides a continuous charging current and automatically transitions from one of: a constant current operating mode to a constant voltage operating mode; or a constant voltage operating mode to a constant current operating mode.

In one embodiment, the IC further includes an end-of-charge circuit having a first input coupled to the output of said control element and having an output and a current gain circuit having a first input coupled to the output of the control element, a second input coupled to the output of the end-of-charge circuit and an output configured to couple to the one or more rechargeable cells.

In one embodiment, the control element comprises a processor configured to apply a saturation function to signals provided thereto such that the power management IC automatically transitions from a constant current operating mode to a constant voltage operating mode in response to voltage levels of the one or more rechargeable cells.

In one embodiment, the control element of the power management IC is provided from an analog-to-digital converter (ADC) circuit coupled to a digital controller which in turn is coupled to a digital-to analog converter (DAC) circuit. The digital controller is configured to receive digital signals provided thereto from the ADC circuit and apply a saturation function to the digital signals such that the battery charger circuit automatically transitions from a constant current operating mode to a constant voltage operating mode in response to the digital signals provided to said digital controller. The DAC receives digital signals provided thereto from the digital controller and provides an analog signal at an output thereof. In one embodiment, the control element of the power management IC comprises a digital signal processor (DSP).

In one embodiment, the control element of the power management IC is provided as an operational transconductance amplifier (OTA).

In one embodiment, the power management IC of charges one or more cells or batteries including lithium-ion batteries for biomedical applications.

In accordance with a further aspect of the concepts described herein, a method for charging a battery comprises comparing a voltage of a battery and a voltage of a reference source to determine a charging current; and in response to the comparing, providing a continuous charging current and automatically transitioning between one of: a constant current operating mode and a constant voltage operating mode; or a constant voltage operating mode and a constant current operating mode.

In accordance with a further aspect of the concepts described herein, a battery charger circuit for charging a battery includes a control element having a first input configured to receive an input from a reference source, a second input configured to receive an input from the battery and an output, said control element having an output current response characteristic which varies with respect to the battery input such that said control element continuously provides a charging current that transitions the charging of the battery from one of: a constant current operating mode to a constant voltage operating mode; or a constant voltage operating mode to a constant current operating mode.

In accordance with a further aspect of the concepts described herein, a battery charger circuit for charging a battery includes a control element having a first input configured to receive an input from a reference source, a second input configured to receive an input from the battery and an output, said control element having an output current response characteristic corresponding to a saturating function that causes the charging current of the battery to automatically transition between a constant current operating mode and a constant voltage operating mode or a constant voltage operating mode to a constant current operating mode which varies with respect to the battery input such that said control element implements.

In one embodiment, described herein is a battery charging circuit for charging a lithium-ion (Li-ion) battery. In one embodiment, the charging circuit is provided as an all-analog battery charger circuit suitable for use in a number of applications including wirelessly rechargeable medical implant devices. The charging circuit also finds use in a number of other applications including, but not limited to mobile phones, personal handy telephone systems (PHS) and any other application in which rechargeable batteries can be used.

In accordance with the concepts, system and techniques described herein, a battery charger circuit (sometimes referred to herein simply as a "charging circuit," a "charger circuit" or more simply a "charger") suitable for charging a lithium-ion (Li-ion) battery includes an operational transconductance amplifier (OTA) having first and second input terminals and an output terminal with a first one of the first and second input terminals configured to receive a reference voltage. The OTA output terminal is coupled to an input of a current gain circuit. An output of the current gain circuit is coupled to a first terminal of a battery and a second terminal of the battery is coupled to a second one of the first and second input terminals of the OTA.

With this particular arrangement, a relatively simple, analog, power-efficient and area-efficient battery charging circuit is provided. The charger circuit utilizes a hyperbolic tangent (tanh) output current profile of the operational transconductance amplifier (OTA) to smoothly transition between constant current (CC) and constant voltage (CV) charging regimes without the need for complex control circuitry which can be power-consuming and also requires additional area which is at a premium when the battery charging circuit is fabricated as a semiconductor circuit.

In one embodiment, the charger circuit also includes an end-of-charge circuit. The OTA output terminal is also coupled to an input of an end of charge circuit with an output of the end of charge circuit coupled to an input of the current gain circuit.

Also, by utilizing a current comparator to detect end-of-charge, the charger circuit described herein eliminates the need for sense resistors in either a charging path or a control loop. By eliminating the control circuitry and the sense resistors, the analog lithium-ion (Li-ion) battery charger may be provided as an ultra-compact Li-ion battery charger. As a result, the charge circuit described herein is an order of magnitude smaller than previous designs, while achieving an efficiency of greater than 75%.

Thus, the battery charging circuit described herein avoids the use of complex control circuitry to manage battery charging at the expense of circuit area and power consumption and also avoids the use of a sense resistor in order to detect end-of-charge.

The OTA is provided having a hyperbolic tangent (tanh) shaped output current profile. By utilizing the hyperbolic tangent (tanh) shaped output current profile of the OTA, the charger circuit transitions between constant current (CC) and constant voltage (CV) charging regions without the need for complex control circuitry. Thus, the battery charging circuit does not require sense resistors to determine end-of-charge, as the control circuitry described herein operates in the current domain. Accordingly, the battery charging circuit described herein is a simple, analog, power-efficient and area-efficient version of previous, more complicated and power-hungry charger circuit designs.

Furthermore, upon startup, the charger circuit is capable of monitoring battery voltage levels and providing charging current during periods of power coupling, as in the case of a wireless power link.

In one embodiment, a power management chip was fabricated in an AMI 0.5 µm CMOS process, consuming 0.15 mm$^2$ of area. This figure represents an order of magnitude reduction in area from conventional designs.

In one exemplary embodiment, a power management circuit achieved 75% power efficiency and charging voltage accuracy of 99.8% relative to a target voltage of 4.2 volts (V).

With this particular arrangement, an ultra-compact analog lithium-ion (Li-ion) battery charger for wirelessly powered implantable medical devices is provided. The charger described herein takes advantage of a tanh output current profile of an operational transconductance amplifier (OTA) to smoothly transition between constant current (CC) and constant voltage (CV) charging regimes without the need for additional area-consuming and power-consuming control circuitry. By utilizing a current comparator to detect end-of-charge, the analog lithium-ion (Li-ion) battery charger circuit described herein eliminates the need for sense resistors in either a charging path or a control loop.

In one specific embodiment, a Li-ion battery charger was based upon the tanh output current profile of a subthreshold OTA. This design utilizes the OTA in an analog feedback loop to control charging current, completely eliminating the need for energy- and space-consumptive control logic. This design operates in the current domain, eliminating the need for precision trimmed sense resistors to determine the end-of-charge point, reducing layout area, manufacturing complexity and potential charging error due to resistor mismatch. The layout area required for such an integrated circuit is more than an order of magnitude smaller than previous designs. The design achieves an average power efficiency of 89.7% over a 3.0V to 4.2V range of battery voltage.

BRIEF DESCRIPTION OF THE DRAWINGS

The foregoing features of this invention, as well as the invention itself, may be more fully understood from the following description of the drawings in which:

FIG. 4 is a schematic diagram of an end-of-charge detector;
FIG. 4A is a schematic diagram of a trickle charge threshold detector and a reference.

DETAILED DESCRIPTION OF ILLUSTRATIVE EMBODIMENTS

Before describing battery charger circuit concepts and techniques which are the subject of this disclosure, it should be appreciated that reference is sometimes made herein to the use of the specific types of cells or batteries (e.g. lithium-ion batteries) or specific applications (e.g. biomedical or mobile telephone applications) or specific voltage levels or specific techniques for implementing portions of a circuit (e.g. Wilson current mirrors). It should, however, be appreciated that such specific references are made only to promote clarity and understanding of the description provided herein and that the battery charger circuit concepts and techniques described herein are not limited to use with any specific type of rechargeable battery or application or voltage level. For example, the automatic constant current to constant voltage transition provided by the circuit and techniques described herein are also useful for charging lead-acid batteries and nickel-metal hydride (NiMH) batteries as well as nickel-cadmium batteries.

Figure 1:
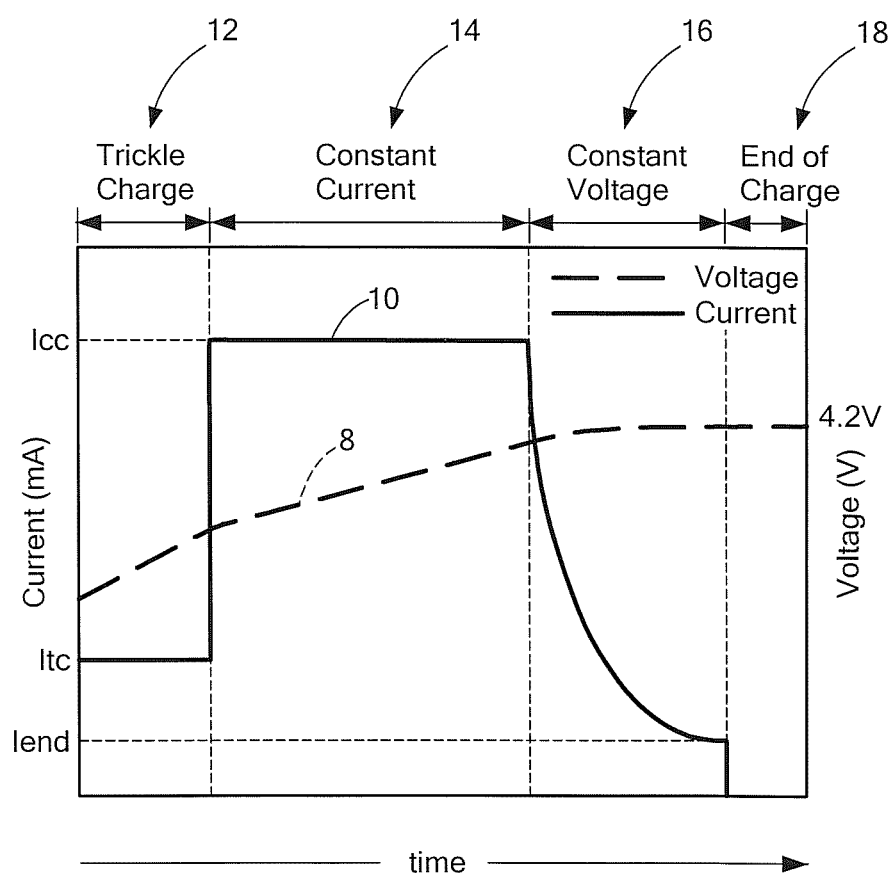
FIG. 1 is a plot of current and voltage vs. time.
Figure 2:
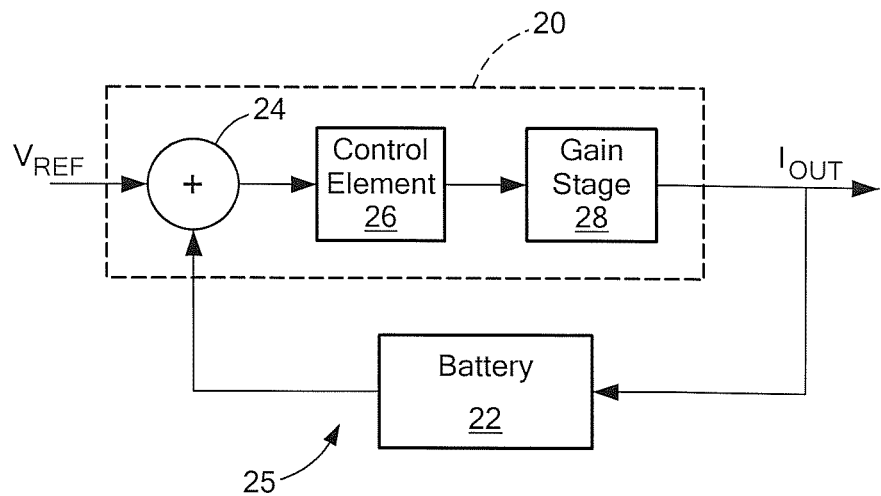
FIG. 2 is a block diagram of a battery charging circuit.

Proceeding now with the description of the drawings and referring now to FIG. 2, a battery charger circuit 20 for charging a battery 22 includes a means 24 for comparing a voltage of the battery to a reference voltage. The reference voltage corresponds to a target voltage of battery 22. Battery charger circuit 20 further includes a negative-feedback loop 25 which comprises a control element 26, a gain stage 28, and the battery itself. It should be noted that battery 22 is not part of charger circuit 20 even though battery 22 forms a portion of negative feedback loop 25 when battery 22 is connected to charger 20.

Control element 26 is provided having an output current response characteristic which varies with respect to the battery input such that control element 26 implements a saturating function which provides a continuous charging current to the battery and causes the continuous charging current to automatically transition between a constant current operating mode and a constant voltage operating mode or vice-versa (i.e. between a constant voltage operating mode to a constant current operating mode).

In one embodiment, control element 26 is provided from an analog circuit such as an operational transconductance amplifier (OTA) having a response characteristic $G_m$ corresponding to the transconductance of the OTA and gain stage 28 is provided as a current gain stage having a current gain characteristic A which corresponds to the current gain from the output of the OTA to the battery. In other embodiments, control element 26 may be provided as a digital circuit such as a digital signal processing circuit.

As will become apparent from the description provided herein below, control element may be provided having an output current response characteristic which corresponds to a hyperbolic tangent (tanh) function or which corresponds to a square function. In short, control element 26 may be implemented having any function which results in a continuous charging current to the battery and causes the continuous charging current to automatically transition between a constant current operating mode and a constant voltage operating mode or vice-versa (i.e. between a constant voltage operating mode to a constant current operating mode).

Figure 2A:
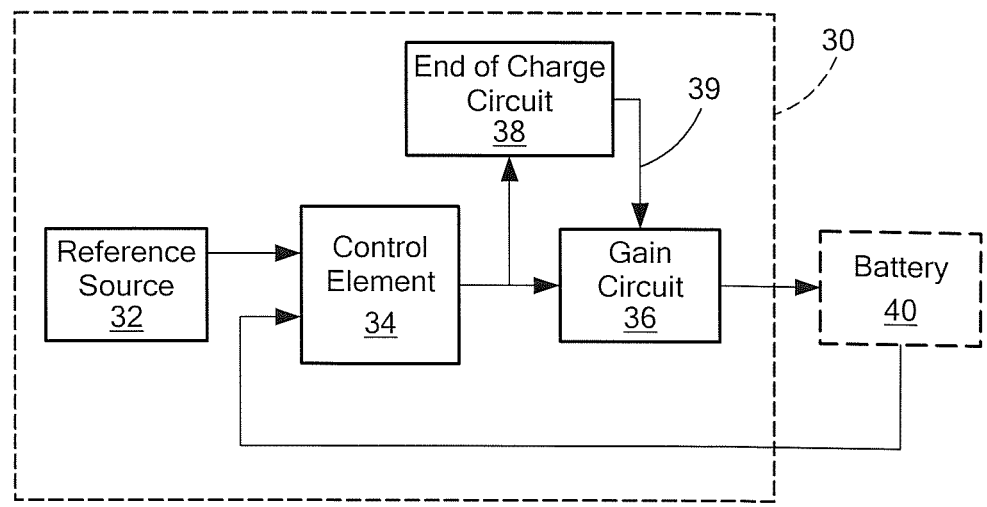
FIG. 2A is a block diagram of a battery charging circuit.

Referring now to FIG. 2A, a battery charger circuit 30 includes a reference source 32 having an output coupled to a first input of a control element 34. Although reference source 32 is here shown as part of battery charger circuit 30, it should be appreciated that in some embodiments, reference source 32 may also be provided external to battery charger circuit 30.

An output of the control element 34 is coupled to an input of a gain stage 36 and also to an input of an end-of-charge detector 38 circuit. It should be appreciated that in some embodiments, it may be desirable or necessary to omit either or both of gain stage 36 and end-of-charge detector 38 circuit from battery charger circuit 30. An output of the end-of-charge detector circuit 38 is coupled through signal path 39 to a second input of the gain stage 36 and an output of the gain stage 36 is coupled to an input of a rechargeable battery 40.

Battery 40 is here shown in phantom since it is not properly a part of battery charger circuit 30. Battery 40 is coupled to a negative input of control element 34 and may also be coupled to a load (not shown in FIG. 2). It should be appreciated that although a single battery is here shown, the battery charger circuit as well as the concepts described herein are suitable for use with one or more rechargeable batteries or cells.

Control element 34 is provided having an output current response characteristic which varies with respect to input voltage such that control element 34 provides a continuous charge current which automatically transitions from a constant current operating mode to a constant voltage operating mode and vice-versa in response to different battery voltages. Thus, control element 34 receives a pair of analog voltage signals at an input thereof and provides an analog output current signal at an output thereof.

In one embodiment, control element 34 implements a saturating function which may be the same as or similar to a hyperbolic tangent (TANH) function. It should be understood that control element 34 need not implement a precise TANH function, rather any function having a general form which is the same as or similar to a TANH function may be used. In one embodiment, control element 34 may be provided as a digital signal processor (DSP) circuit which receives a pair of input voltages and provides and output current in response thereto.

Figure 2B:
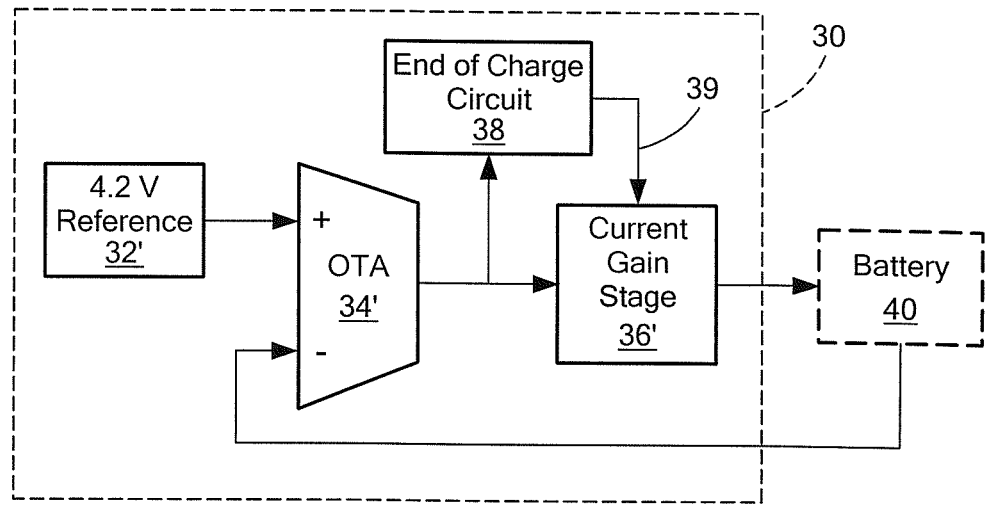
FIG. 2B is a block diagram of a battery charging circuit which includes an operational transconductance amplifier (OTA)

Referring now to FIG. 2B in which like elements of FIG. 2A are provided having like reference designations, a battery charger circuit 30 includes a 4.2 reference voltage source 32' having an output coupled to a positive input of an operational transconductance amplifier (OTA) 34'. Although reference voltage source 32 is here shown as part of battery charger circuit 30, it should be appreciated that in some embodiments, reference voltage source 32' may also be provided external to battery charger circuit 30.

An output of the OTA 34' is coupled to an input of a current gain stage 36' and also to an input of an end-of-charge detector circuit 38'. An output of the end-of-charge detector 38' is coupled through signal path 39 to a second input of the current gain stage 36' and an output of the current gain stage 36' is coupled to an input of a rechargeable battery 40. Battery 40 is again here shown in phantom since it is not properly a part of battery charger circuit 30. Battery 40 is coupled to a negative input of the OTA 34' and may also be coupled to a load (not shown in FIG. 2). It should be appreciated that although a single battery is here shown, battery charger circuit concepts described herein are suitable for use with one or more rechargeable cells or batteries.

In operation of the exemplary circuit shown in FIG. 2B, the OTA 34' compares the voltage of battery 40 to the voltage of the reference source 32' in order to determine the charging current. In one embodiment, reference source 32' may be provided as a bandgap reference source such as the type described below in conjunction with FIG. 3A. For battery voltages less than the reference voltage provided by reference voltage source 32', the OTA output is saturated. As the battery voltage approaches the level of the reference voltage provided by reference voltage source 32', the difference in input terminal voltages becomes small enough such that OTA 34' enters its linear region and the output current provide by OTA 34' begins to decrease. In one embodiment, the OTA is designed to operate in its subthreshold mode to save power and also to reduce its linear range. It should, however, be appreciated that in some embodiments it may be desirable or necessary to provide the OT as an above-threshold OTA.

Current gain stage 36' receives the signal provided thereto from OTA 34' and increases the current output of OTA 34' provided to battery 40. Current gain stage 36' may be compromised of current mirrors or may be provided using any other technique to increase current received from OTA 34.

The end-of-charge circuit 38 detects the end-of-charge by comparing the output signal provided thereto from the OTA 34' to a reference current. In one embodiment, this reference current is proportional to the reference current used to bias the OTA. This approach reduces, or ideally minimizes, error between the reference voltage and the battery voltage.

When end-of-charge circuit 38 detects an end-of-charge condition, the end-of-charge circuit 38 provides an end-of-charge signal to current gain circuit 36' along signal path 39. The end-of-charge signal disables (or otherwise prompts or controls) current gain circuit 36' such that the charge current provided from current gain circuit 36' to battery 40 is reduced to zero.

In the case where battery charging circuit 30 is provided as a Li-ion battery charger circuit 30, reference voltage source 32' is provided as a 4.2V reference source. In one embodiment, the 4.2V reference source is provided using a bandgap reference followed by a non-inverting op-amp to produce a stable output voltage over a range of temperatures. This particular design is intended to be used in an implantable device, thus the expected temperature variation is limited. Nevertheless, it should be appreciated that the design and concepts described herein are robust enough for charging applications where temperature varies significantly.

In operation as a Li-ion battery charger circuit 30, the OTA 34' compares the voltage of battery 40 to the voltage of the bandgap reference 32' (in this case a 4.2V bandgap reference) in order to determine the charging current. For battery voltages less than approximately 4.1V, the OTA output is saturated. As the battery voltage reaches 4.1V, the difference in input terminal voltages becomes small enough that the OTA enters the linear region and the output current begins to decrease. In one embodiment, the OTA is preferably designed to operate in subthreshold to save power and also to reduce its linear range. In order to account for the trickle-charge region, the OTA topology was modified as will be described below in conjunction with FIG. 3.

Figure 2C:
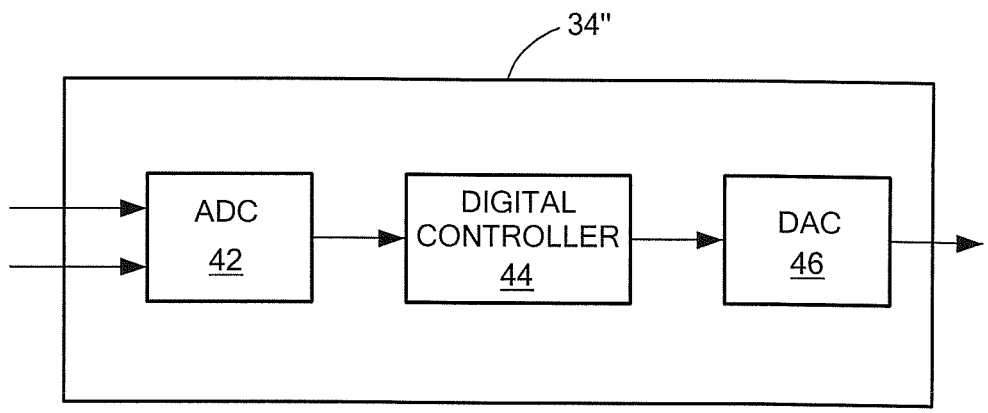
FIG. 2C is a block diagram of a digitally implemented control element of the type described in conjunction with the battery charging circuits of FIGS. 2 and 2A.

Referring now to FIG. 2C, a control element 34" which may be used in a battery charger circuit such as the type described above in conjunction with FIGS. 2-2B, is here implemented as a digital circuit comprising an analog to digital converter (ADC) configured to receive a pair of analog input signals (e.g. a reference voltage signal and a battery voltage signal) and to provide a digital signal at an output thereof. The signal provided at the output of ADC 42 has a value corresponding to a difference of the two signals provided to the input thereof. The output of ADC 42 is provided to an input of a digital controller 44. Digital controller is configured to receive digital signals provided thereto from the ADC circuit 42 and to apply a saturation function to the digital signals provided thereto such that the battery charger circuit automatically transitions from a constant current operating mode to a constant voltage operating mode in response to the voltage levels of a battery. In one embodiment, digital controller implements a saturating function which may be the same as or similar to a hyperbolic tangent (TANH) function. It should be understood that digital controller 44 need not implement a precise TANH function, rather any function in the form of a TANH function or similar (e.g. a square law function may be used. In one embodiment, digital controller 44 may be provided as a digital signal processor (DSP) circuit.

A digital-to analog converter (DAC) circuit has an input configured to receive a digital signal from the digital controller and an output at which an analog signal is provided. The output of DAC is configured to coupled to a gain stage (e.g. gain stage 36 in FIG. 2A). Thus, in one embodiment, a digital control element receives a pair of analog voltage signals at an input of a DAC and provides an analog output current signal at an output of an ADC which corresponds to a continuous charging current to a battery (e.g. battery 22 or 40 described above in conjunction with FIGS. 2 and 2A, respectively) and causes the continuous charging current to automatically transition between a constant current operating mode and a constant voltage operating mode or vice-versa (i.e. between a constant voltage operating mode to a constant current operating mode).

Figure 3:
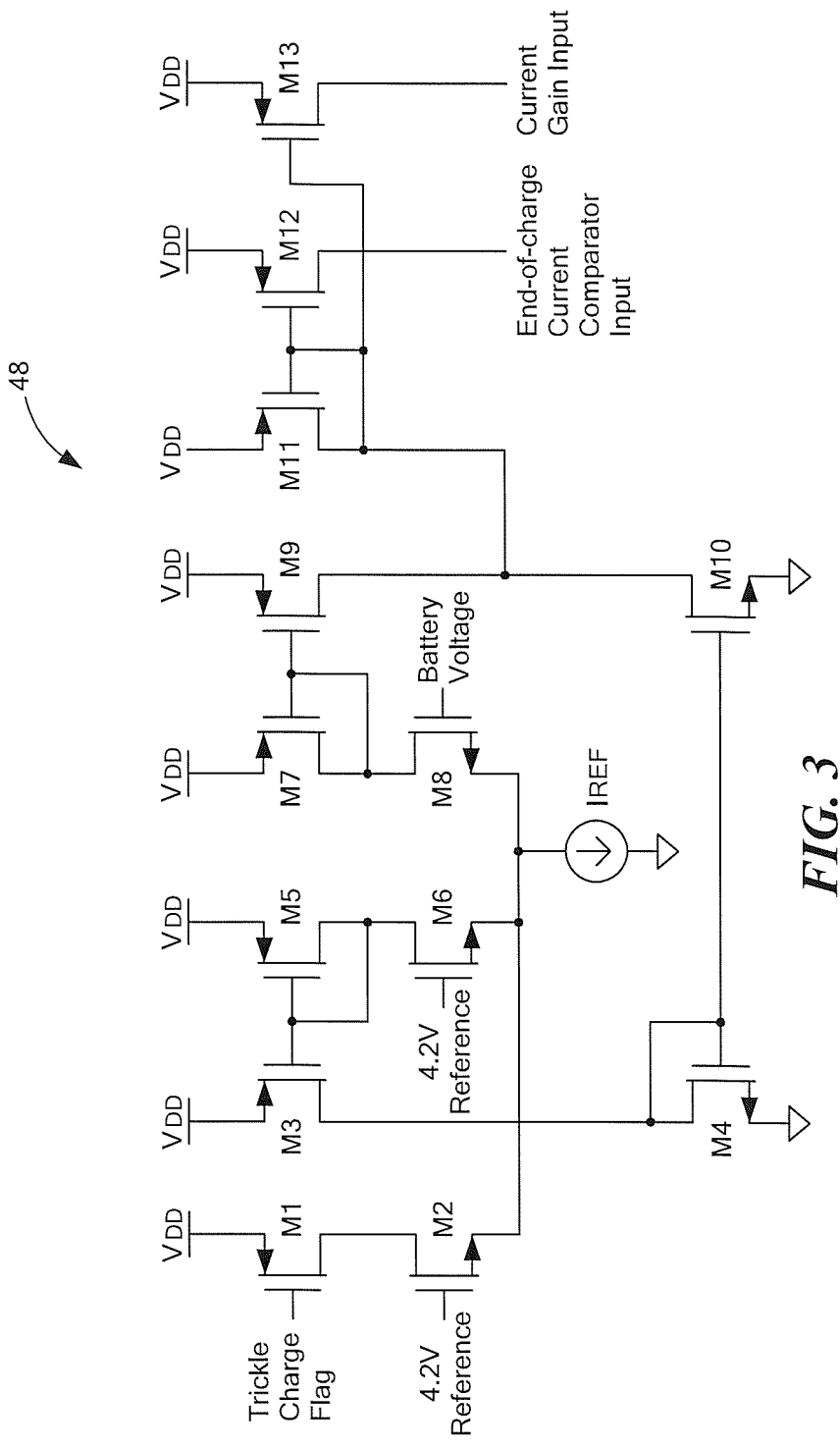
FIG. 3 is a schematic diagram of an OTA and a trickle charge circuit.

Referring now to FIG. 3, an OTA 48 includes a pair of transistors M1, M2 series coupled between a drain supply voltage $V_{DD}$ and a terminal of a reference current source $I_{REF}$. A gate terminal of transistor M1 is configured to receive a Trickle Charge Flag voltage signal and a gate terminal of transistor M2 is configured to receive a reference voltage. As will be discussed below, Trickle Charge Flag voltage signal has one of a logic low or a logic high voltage level. As mentioned above, in the case where the OTA is utilized in a Li-ion battery charging circuit, the reference voltage corresponds to a 4.2 volt reference voltage source.

The trickle-charge modification mentioned above in conjunction with FIG. 2B, is the addition of transistors M1 and M2 to the OTA 42.

In the exemplary embodiment shown in FIG. 3, if the battery voltage is less than 3 V, the Trickle Charge Flag signal voltage is low enabling transistor M1 (i.e. the Trickle Charge Flag signal voltage is provided having a value which biases transistor M1 into its conduction state). In this case, transistor M2 conducts some current, which reduces the OTA output via current stealing of the bias current. The reduction in charging current during trickle-charge is proportional to the ratio of the gate width to gate length (W/L) of transistor M2 to the gate W/L of transistor M6.

Once the battery voltage crosses the 3V threshold, the Trickle Charge Flag signal voltage goes high disabling the current path through transistors M1 and M2 (i.e. the Trickle Charge Flag signal voltage is provided having a value which biases transistor M1 into its non-conduction state). As a result, the current output of the OTA 42 is increased to its maximum value.

In one embodiment, the current gain stage is comprised of current mirrors to increase the current output of the OTA, from a few hundred nano-amperes to whatever charging current is required in the design.

One exemplary application had a constraint of 10 mW of power consumption. Thus, with this particular constraint, the charging current was limited to 2 mA. Consequently, all current mirrors in the circuit including those in the OTA were of the Wilson Current Mirror type in order to reduce channel length modulation error. In other applications (or even in this exemplary application) other types of current mirrors may also be used.

The end-of-charge is detected by comparing the output of the OTA 42 to a reference current. As mentioned above, in order to reduce, or ideally minimize error, the reference current is proportional to the reference current used to bias the OTA 42.

Figures 3A, 3B:
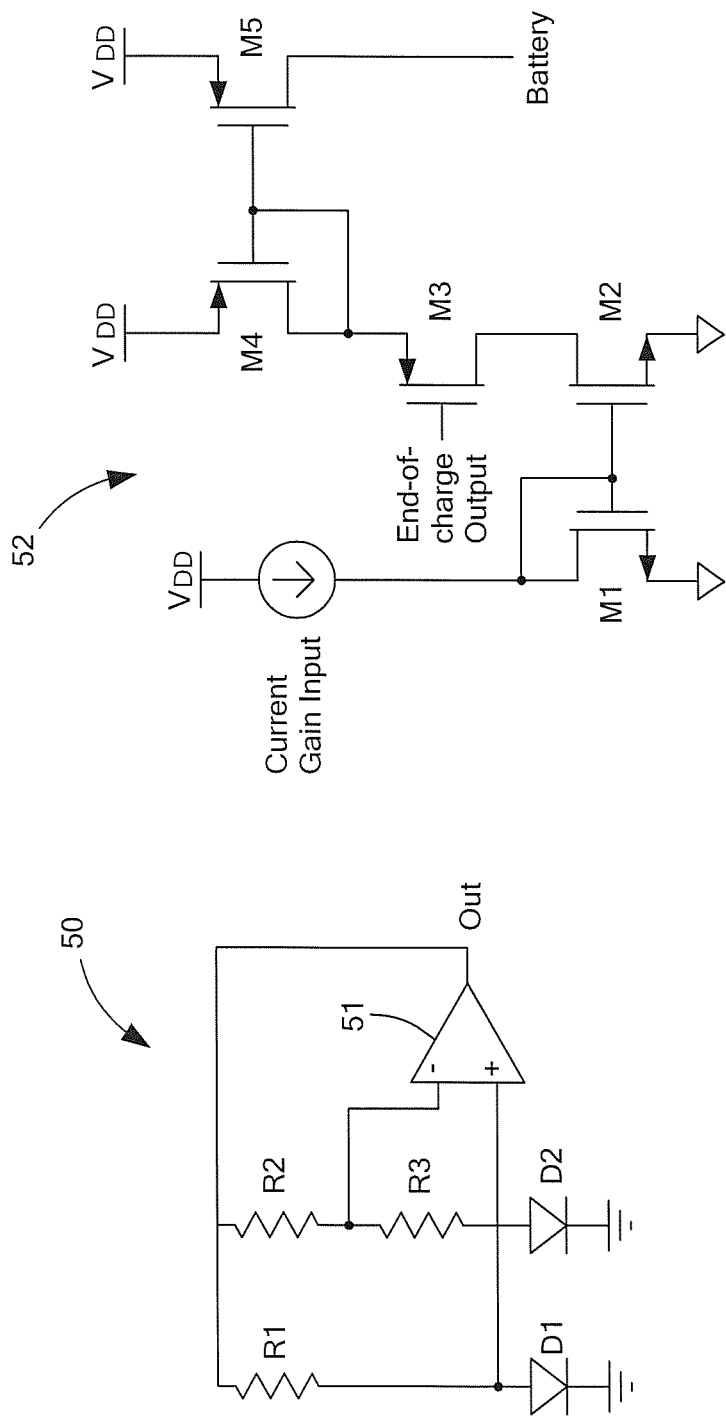
FIG. 3A is a schematic diagram of a bandgap reference circuit.
FIG. 3B is a schematic diagram of a current-gain stage with a disable option.

Referring now to FIG. 3A, optimizing charger design for battery longevity places tight design tolerances on the end-of-charge detection circuit, over a range of operating temperatures and supply voltages. To ensure proper circuit operation under these conditions an on-chip bandgap reference circuit 50 shown in FIG. 3A, followed by a non-inverting op-amp circuit 51 to generate an accurate 4.2V reference may be used.

In the instance of wirelessly rechargeable devices, supply voltage variation is a significant concern. Examples of experimental wireless power links and the analysis thereof are known. The rectified voltage from this wireless power link has a ripple of approximately 5 mV. In the context of a Li-ion battery, error tolerances of less than 0.25% are required in the output voltage ripple of the bandgap reference. The power supply rejection ratio (PSRR) is mainly determined by the amplifier in FIG. 3A. The operational amplifier was operated at intentionally low power levels and it demonstrated approximately 21 dB of power supply rejection ratio (PSRR) at 6.75 MHz, a typical operating frequency for many inductive power links. Assuming that the ripple voltage from such a wireless link is 5 mV, this PSRR implies a ripple output voltage of approximately 500 µV, or a 0.012% error. Thus, the expected error due to the ripple in the power supply is well below the acceptable error tolerance of 0.25% in the design described herein.

A properly designed voltage reference maintains extremely small output voltage variation over a wide temperature range by utilizing the ratio of two resistors in the feedback path of an amplifier, rather than their absolute values. As the gain of a non-inverting op-amp is itself only dependent on this resistor ratio, the circuit output is also tolerant to resistor fabrication error when fabricated using standard VLSI layout techniques. To allow fabrication of this circuit in standard CMOS process, we utilized parasitic bipolar diodes. To provide additional immunity to process variation, 7 bits of trimming in the gain of the non-inverting amplifier were included such that the voltage reference can be changed by ±15% in increments of 0.25%. Trimming includes changing the value of one of the resistors that sets the gain in the non-inverting amplifier. Utilizing these techniques, a final charging voltage of 4.202 V was obtained which corresponds to an error less than 0.1%.

Referring now to FIG. 3B, a current-gain stage 52, shown in FIG. 3B, is comprised of standard current mirrors to increase the current output of the OTA from a few hundred nano-amps to the appropriate charging current for the battery. One application was constrained to about 10 mW of power consumption, so the charging current was limited to approximately 2.5 mA. By increasing the gain in the current mirror stage in FIG. 3B, the battery charger can be modified to increase its charging current from a few mA to several amps for other high-power applications.

Referring now to FIG. 4, an end-of-charge current comparator circuit 54 receives an end-of-charge current comparator input at an input terminal 54a thereof and provides end-of-charge output signal at an output terminal 54b. In the exemplary circuit described herein, the end-of-charge current comparator input signal is provided via transistor M12 (FIG. 3) of OTA 48 (FIG. 3).

The end-of-charge output signal value is low when the OTA output is higher than $I_{REF}$. Otherwise, the end-of-charge output signal value equals $V_{DD}$. When the end-of-charge output signal is high, the last stage of current mirrors in the current gain block is disabled, reducing the charge current to zero.

The end-of-charge detector shown in FIG. 4 compares the End-of-charge Input, shown in FIG. 3, to a reference current. In order to minimize error, the reference current utilized in the end-of-charge detector is proportional to the reference current used to bias the OTA. FIG. 4 shows the schematic of the current comparator employed in the end-of-charge circuit. The End-of-charge Output signal is normally at ground when the End-of-charge Input is higher than $I_{REF}$, and transitions to $V_{DD}$ when this condition is no longer true. The transition to $V_{DD}$ inactivates M3 in FIG. 3B, thus reducing the battery charge current to zero.

Figure 4B:
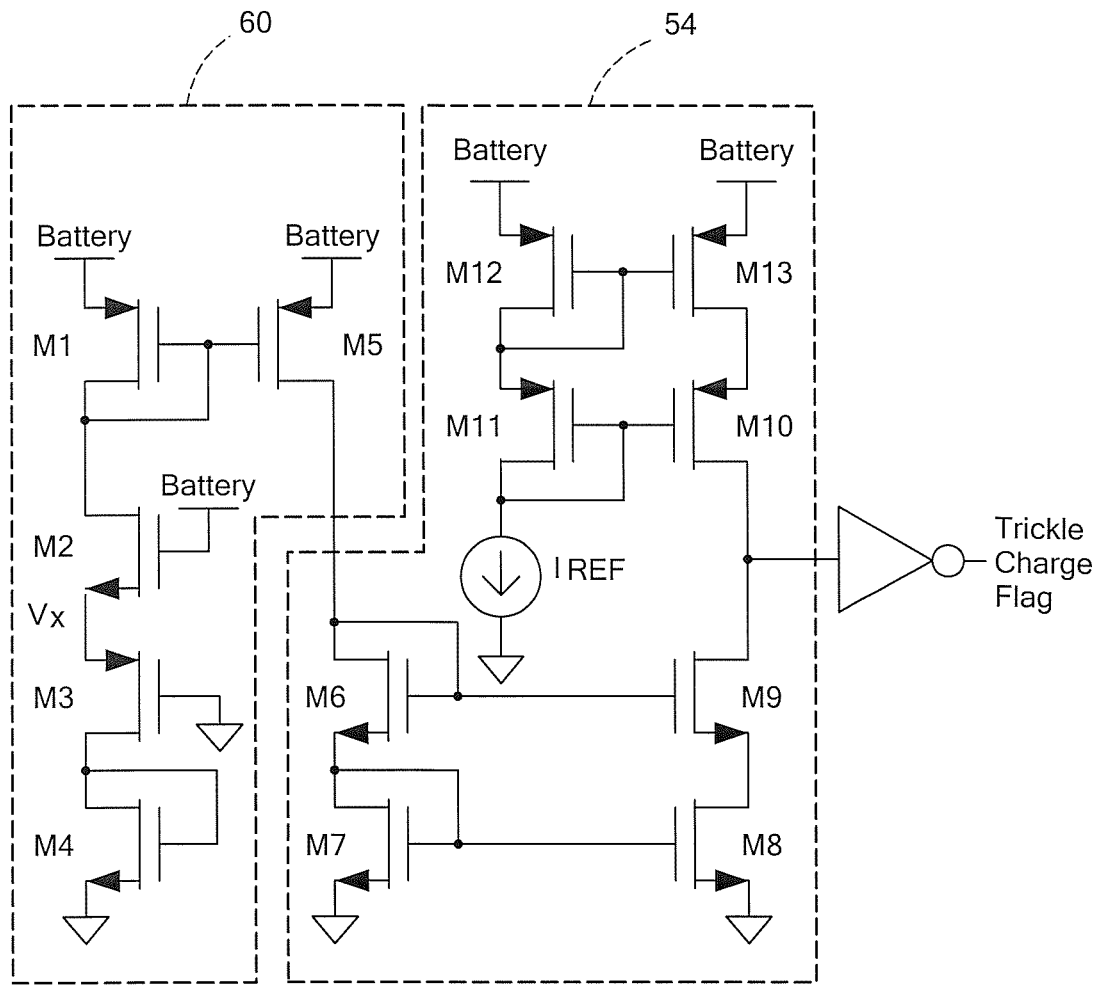
FIG. 4B is a schematic diagram of a trickle charge threshold detector.

In order to determine when the battery reaches the 3 V threshold for the trickle-charge region of operation, a low-power detector circuit, shown in FIG. 4B was used. As the battery voltage decreases, the voltage at the node $V_x$ between transistors M2 and M3 decreases. The relationship between the voltage at this node and the battery is linear, so the current flowing through transistor M5 reduces quadratically when M2 and M3 are in saturation, and exponentially when they enter subthreshold. When the battery voltage is below 3 V, the current output of transistor M5 is smaller than the reference current, $I_{REF}$, so the Trickle Charge Flag is low. Transistors M1 through M5 are designed with large widths and lengths in order to minimize process variation. This strategy also minimizes power consumption such that the threshold detector may be run off the battery voltage directly. The designed threshold detector consumes only 3 μW, when the battery voltage is approximately equal to 3.7 V, and very little layout area as the design does not require any resistors.

In one embodiment, the OTA in the circuit described herein conjunction with FIG. 3 is biased with 125 nA and the maximum charging current during constant-current is almost 2.8 mA. This implies that the current gain, A, has a maximum value of 22,400. The transconductance of the OTA is given by Equation (1):

$$G_m = \frac{I_{REF}}{V_L} \quad (1)$$

In which $I_{REF}$ and $V_L$ are the OTA bias current and linear range, respectively.

According to Equation (1), the transconductance $G_m$ for this circuit equals approximately $1.25 \times 10^{-6}$. When the battery is modeled as a simple resistor in series with a capacitor, assuming that, as in most electrode-electrolyte situations, the spreading resistance and double-layer capacitance are dominant, the battery's impedance is then given by Equation (2), where R and C are the battery's resistance and capacitance, respectively.

$$Z_{BATTERY} = \left(\frac{sRC + 1}{sC}\right) \quad (2)$$

The battery resistance is approximately 1Ω while the capacitor of an 8 mAh is approximately 26 Farads. Thus, the following expression for the loop transmission of the circuit is given as:

$$L(s) = G_m A Z_{BATTERY} \quad (3)$$
$$= 28 \times 10^{-3} \left(\frac{sRC + 1}{sC}\right)$$

Assuming the capacitance of the battery is 26 Farads, and the resistance is 1Ω, the loop crossover frequency is near 1.1 mrads$^{-1}$ while the loop-transmission zero is at nearly 6.1 mHz.

The next poles in the charger are caused by the last stage of the current mirror and other dynamics within the transconductance amplifier and are estimated to be near 10 kHz, which is well past the crossover frequency. Thus, the feedback loop is quite stable for the described settings.

Figure 5:
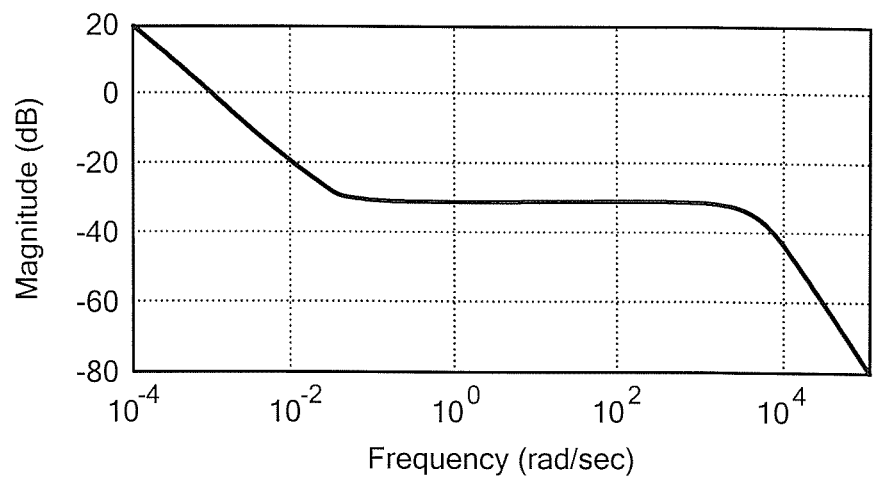
FIG. 5 is a Bode plot of a magnitude of a loop transmission vs. frequency.
Figure 5A:
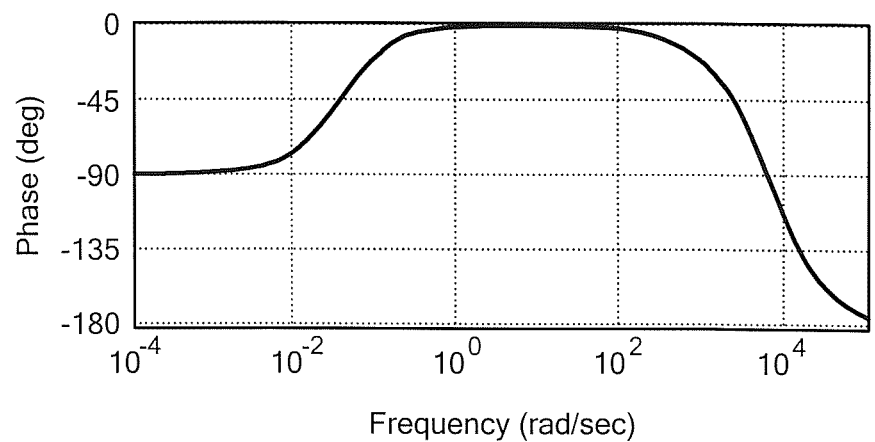
FIG. 5A is a Bode plot of a phase of a loop transmission vs. frequency.

As long as the gain setting of the feedback loop is not too high such that the fixed zero due to the battery occurs well past the crossover frequency, the effect of the high-frequency dynamics in the transconductor do not matter, and the feedback loop is stable and exhibits nearly ninety degrees of phase margin. For the described settings, this situation was found to be true for virtually any battery with a capacity greater than a few mAh. A Bode plot of the loop transmission described by Equation (3) along with a couple of parasitic poles located at approximately 10 kHz is shown in FIGS. 5 and 5A.

Referring now to FIG. 4A, a low-power detector circuit 60 includes a plurality of input terminals 60a-60c at which input signals (e.g. battery voltage signals) are provided and an output terminal 60d at which a low-power detector circuit output signal is provided.

In the exemplary embodiment of FIG. 4A, a voltage signal is provided by a battery (e.g. battery 40 in FIG. 2) to inputs

60*a*, 60*b*, 60*c*. Detector circuit inputs 60*a*, 60*b* correspond to drain terminals of FETs M1, M5 respectively, and detector circuit input 60*c* corresponds to a gate terminal of FET M2 while detector circuit output 60*d* corresponds to a source terminal of FET M2.

When the battery is fully charged, transistors M1 and M5 are biased into their conduction states and transistor M2 is biased into its non-conduction state. Thus, the voltage at node $V_x$ is provided having a first value and the detector circuit output signal at output terminal 60*d* is provided having a first output value.

As voltage of the battery decreases, the voltage at a node $V_x$ between transistors M2 and M3 decreases. The relationship between the voltage at node $V_x$ and the battery is substantially linear. Thus, the current flowing through transistor M5 reduces quadratically when transistors M2 and M3 are in saturation and exponentially when transistors M2 and M3 enter sub-threshold.

The current output of transistor M5 is coupled through a current comparator to detect when the battery voltage falls below a predetermined threshold voltage (e.g. 3V for a Li-ion battery). The current comparator may be the same as, or similar to, the current comparator described above in conjunction with FIG. 4.

Thus, low-power detector circuit 60 determines when a battery reaches a threshold voltage level (e.g. a 3V threshold level for the trickle-charge region for a Li-ion battery) by sensing a voltage signal provided by a battery to inputs 60*a*, 06*b*, 60*c* and determining, sensing, monitoring or otherwise detecting a change in current flowing through transistor M5.

Low-power detector circuit 60 detects low battery voltage (e.g. a critically low battery voltage), in order to reduce (or ideally prevent) any damage to a battery which may occur due to deep discharge of the battery. In operation, when low-power detector circuit 60 detects that a predetermined threshold level is reached, the detector circuit 60 cuts off power provided from the battery to a load.

In one exemplary embodiment, transistors M1 through M4 are provided having relatively large gate widths and gate lengths in order to minimize process variation. This strategy also reduces, or in some cases even minimizes, power consumption such that the threshold detector may be run off the battery voltage directly for substantially constant protection against deep discharge. In one embodiment, the threshold detector consumes only 3 μW of power when the battery voltage is approximately equal to 3.7 V.

Figure 6:
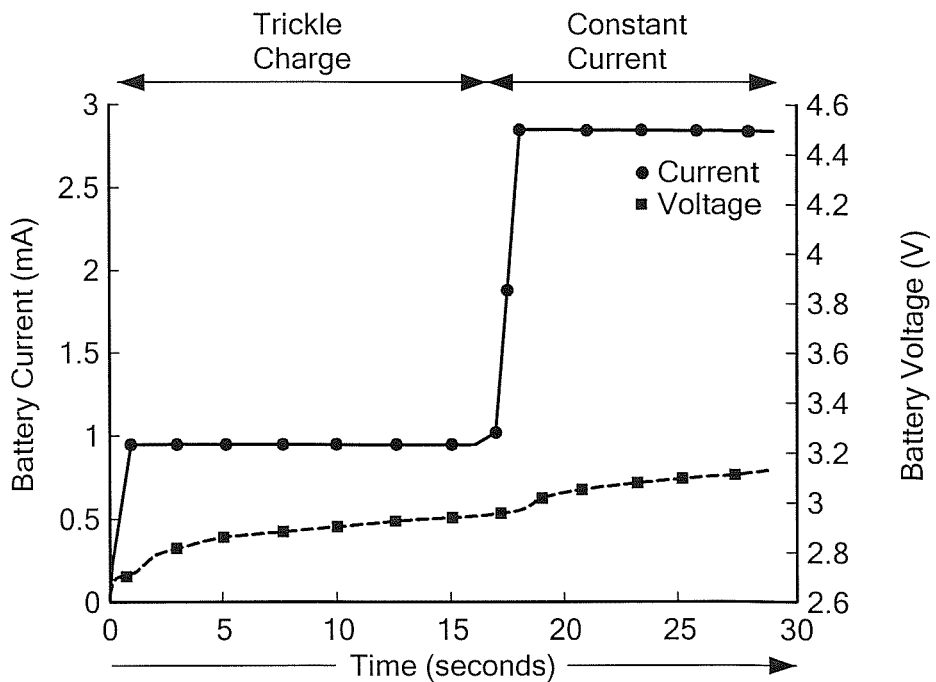
FIG. 6 is a plot of a trickle charge portion for a measured battery current and voltage vs. time when charging a battery.
Figure 6A:
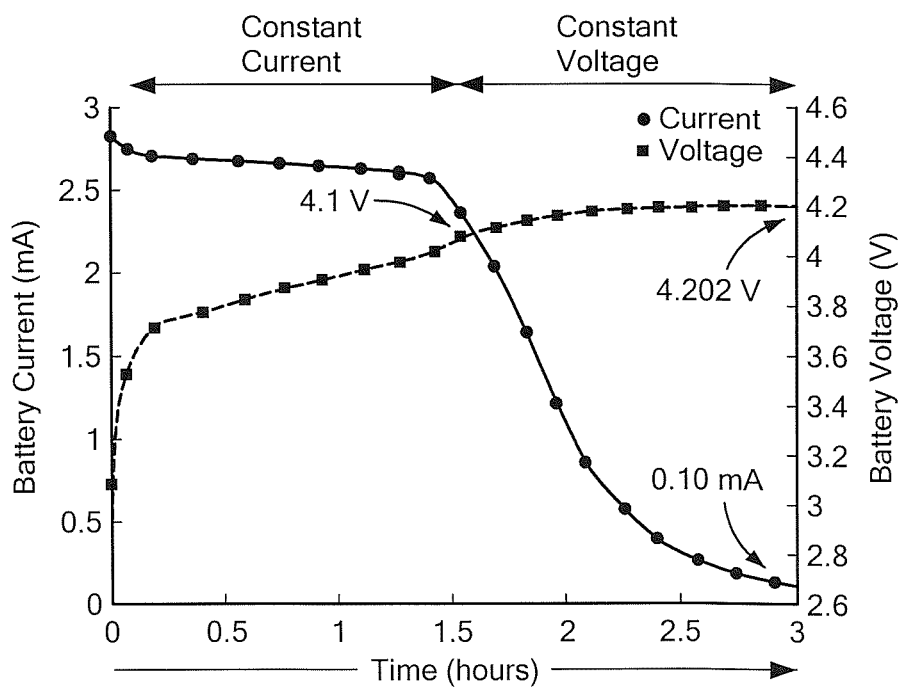
FIG. 6A is a plot of constant current, constant voltage and end-of-charge portions for the measured battery current and voltage vs. time when charging the battery of FIG. 6A.

In one embodiment, a battery-management integrated circuit (aka a "chip") was fabricated in an AMI 0.5 μm CMOS process, consuming 0.16 mm² of chip area. FIGS. 6 and 6A illustrate measured battery current and voltage when charging an 8 mAh battery with FIG. 6 showing the trickle-charge region and FIG. 6A showing the constant-current, constant-voltage, and end-of-charge region.

FIG. 6 shows the measured results of the battery management IC charging an 8 mAh battery from trickle-charge to the beginning of the constant-current region. The battery was charged with 0.9 mA and 2.8 mA during trickle-charge and in the constant-current regime respectively. The supply voltage was set to 4.3 V.

FIG. 6A shows the remaining regions of the charging profile: constant-current, constant-voltage, and end-of-charge respectively. The constant-voltage region begins when the battery reaches approximately 4.1 V and the OTA starts to enter its linear range. The transition between constant-current operation and constant-voltage operation is continuous since the control loop is based on a simple tanh function. According to FIG. 6A the charging current decreases as the battery voltage goes from 4.1 V to 4.2 V, reaching the end of charge when the current is approximately 0.10 mA. At the end of charge the battery voltage is 4.202 V, providing an accuracy higher than 99.9%.

While this chip is limited to about 2.8 mA of maximum charging current, the design presented can accommodate currents of at least 100 mA by simply increasing the ratio of current gain in FIG. 3B or by increasing the OTA bias current in FIG. 3. Beyond 100 mA, stability degrades due to excessive gain in the current mirror. If the desired charging current exceeds 100 mA, the system can be stabilized by adding a pole to the feedback loop that forces the crossover frequency to occur well below the high-frequency dynamics of the transconductor. This pole can be added by including an off-chip capacitor between the gate of M5 and ground in FIG. 3B. The addition of this pole does not affect the charging efficiency or the layout area since the only required component is an off-chip capacitor.

Figure 7:
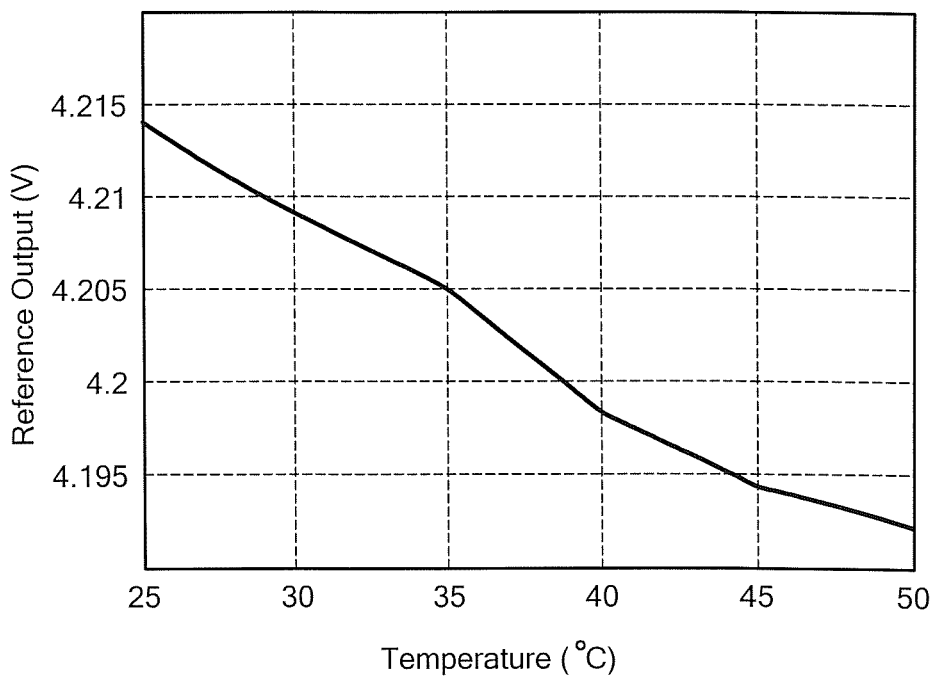
FIG. 7 is a plot of a reference output voltage vs. temperature.

The 4.2 V reference was measured over a temperature range from 25° C. to 50° C. to demonstrate that it is relatively insensitive to temperature variation. The plot of the voltage reference versus temperature is shown in FIG. 7. This battery charger was designed to be part of an implantable medical device; therefore, the measured temperature range is well beyond the typical temperature variation within a human body. According to FIG. 7 the reference error is always less than 0.3%, and therefore, negligible.

Figure 7A:
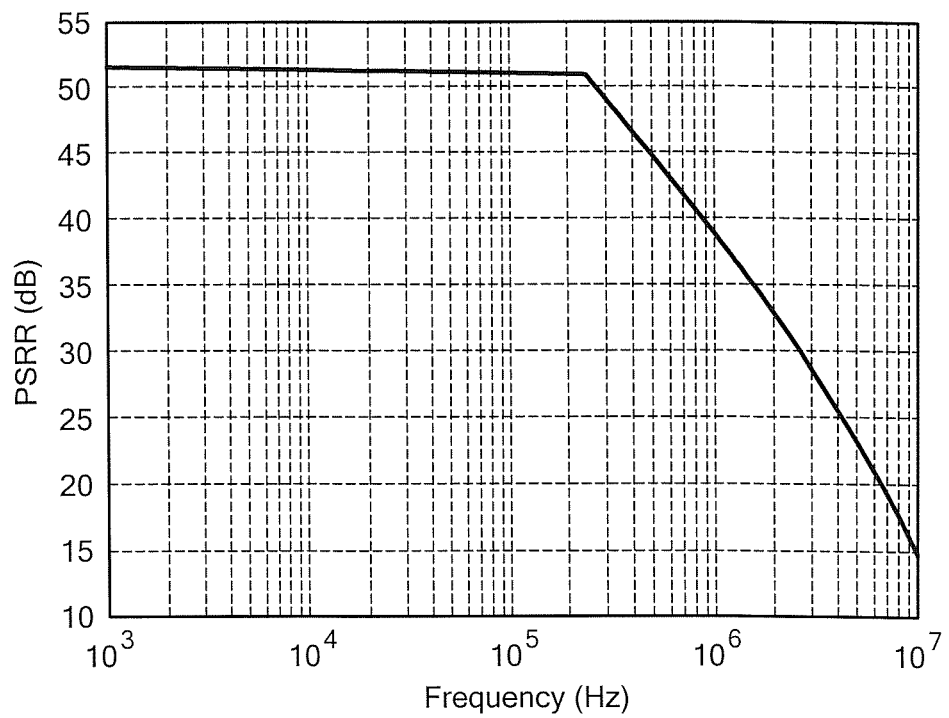
FIG. 7A is a plot of a power supply rejection ratio (PSRR) vs. frequency (Hz).

The power supply rejection ratio (PSRR) of the 4.2 V reference was measured from 1 kHz to 10 MHz since the supply voltage, which is generated from an inductive power-link, might have some noise with an amplitude close to 5 mV. A plot of the 4.2 V PSRR is shown in FIG. 7A. It can be seen from FIG. 7A that the PSRR around 6.785 MHz is approximately 21 dB, which causes less than a 0.5% error at the output of the voltage reference. Thus, the error due to power supply noise is negligible.

Figure 8:
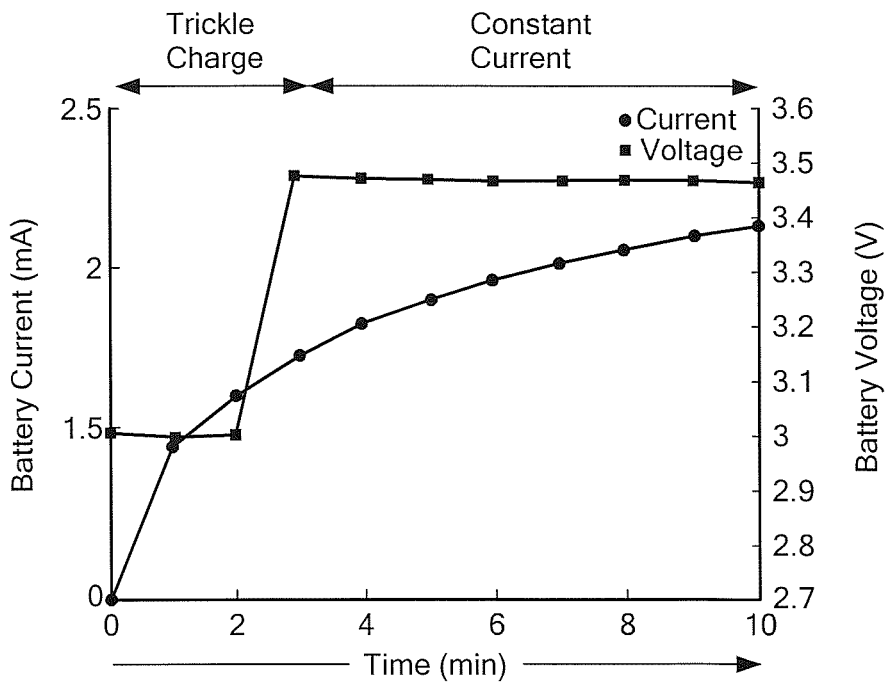
FIG. 8 is a plot of a trickle charge portion for a measured battery current and voltage vs. time.

Referring now to FIG. 8, measured results of a power or battery management integrated circuit (IC) charging a 25 mAh battery during trickle charge and a portion of the constant current region are shown. The battery was charged with 1.5 mA and 2.2 mA during trickle charge and constant current, respectively. Although trickle charge is not strictly needed in this case since the constant current charging rate is already less than 0.1 C for the 25 mAh battery, it is included here to demonstrate circuit functionality. Further, while the exemplary concept circuit was limited to about 2 mA maximum charging current, the design can easily be modified if a higher charging current is required by adjusting current gain in the circuit (e.g. by adjusting current gain in the last stage of current mirrors in a current gain circuit such as current gain circuit 36 shown in FIG. 2).

Figure 8A:
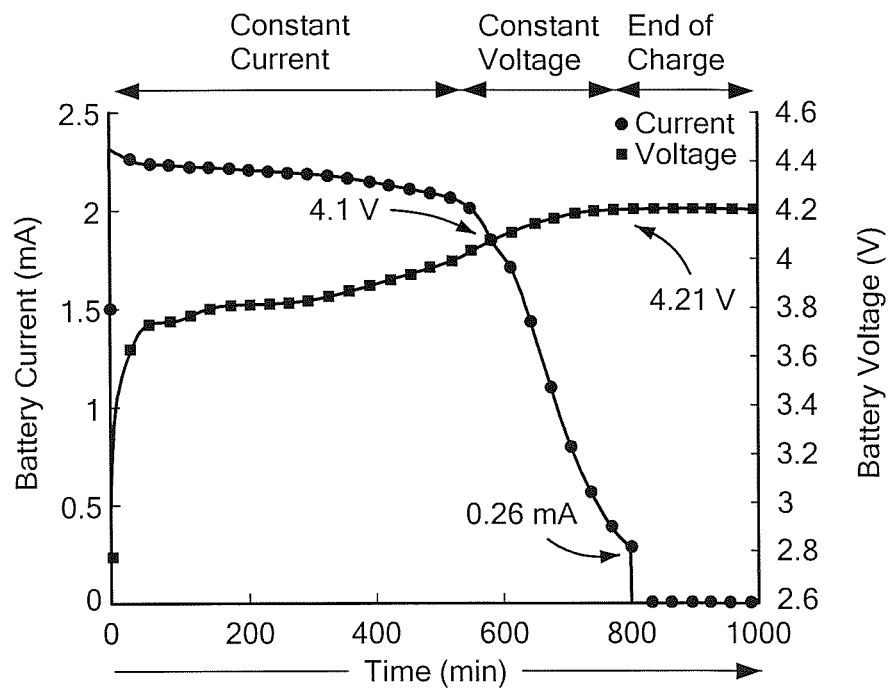
FIG. 8A is a plot of constant current, constant voltage and end-of-charge portions for the measured battery current and voltage vs. time when charging the battery of FIG. 8A.

Referring now FIG. 8A, shown are the remaining regions of the charging profile for an LI-ion battery: constant current, constant voltage, and end-of-charge. The constant voltage region begins when the battery reaches approximately 4.1V. The transition between constant current and constant voltage is continuous since the control loop is based on a hyperbolic tangent current function of the OTA.

As can be seen in FIG. 8A the charging current decreases as the battery voltage decreases from 4.1 V to 4.2 V, reaching the end of charge when the current is approximately 0.26 mA. At the end of charge, the battery voltage is 4.21V providing an accuracy of about 99.8%. In this test, with a 25 mAh battery, the total charging time was about 800 minutes. This long charging time is purely due to the maximum charge current of 0.1C, which was determined by the power consumption requirement of 10 mW. If the current mirrors are adjusted to provide 10 during constant current, a charging time of a few hours can be attained with this 25 mAh cell.

For the circuit measured in FIGS. 8, 8A, during constant current mode, a power efficiency of approximately 75% was obtained. One limiting factor in efficiency is the fact that the test circuit was designed for a 5V supply. It is however, possible to design for a lower supply voltage, increasing the overall power efficiency of the system. This can be accomplished by simply reducing the supply voltage from 5V to 4.5V. Such a reduction in supply voltage increases the efficiency of this circuit to approximately 83% from 75%. In the exemplary IC embodiment described, it was not possible to reduce the supply voltage to 4.5V because of the inclusion of Wilson current mirrors in the OTA. Nevertheless, the Wilson current mirrors are replaced with current mirrors that require less voltage headroom, the supply voltage can be reduced to 4.5 V.

Table I below compares the design described herein in conjunction with FIGS. 6 and 6A with published data of prior art Li-ion charger circuits. As noted in Table I below, data for only one chip with comparable current was found that listed the layout area and power efficiency.

TABLE I

| Design | Power Efficiency | Layout Area | Max. Charging Current | Input Voltage |
| --- | --- | --- | --- | --- |
| Prior Art 1 | 83% | PCB | 800 mA | Adaptive |
| Prior Art 2 | 67.9% | 1.96 mm2 | 700 mA | 5 V |
| Prior Art 3 | 82% | 2.6 mm2 | 700 mA | Adaptive |
| Prior Art 4 | 72.3% | Not Specified | 312 mA | 4.5 V |
| Prior Art 5 | 73% | 1.74 mm2 | 1.5 mA | 4.3 V |
| This Work | 89.7% | 0.16 mm2 | 3 mA | 4.3 V |

Thus the design described herein was also compared with high-charging current designs. Overall, an average power efficiency of approximately 89.7% was obtained during the entire battery charging period, from 3.0V to 4.2V, for a supply voltage of 4.3 V. It should be noted that several alternative designs presented in the literature only report the maximal charging efficiency, rather than an average efficiency over the range of battery voltage such that an exact comparison is difficult.

It is proposed the average charging power efficiency over the entire battery range as a metric for future comparison. As can be seen from Table II, even using the more conservative average power efficiency metric, the design described herein achieves higher power-efficiency while consuming less area than any other prior art designs found in the literature.

In order to have a fair comparison between layout area, the charging current of this design must be increased from 3 mA to about 700 mA, which is a factor of 230. One can easily increase the charging current by a factor of 20 by increasing the bias current of the OTA in FIG. 3. The bias current is only 125 nA such that it can easily be increased to approximately 2.5 µA without requiring large widths in the input pair of the OTA to guarantee that it operates in the subthreshold regime.

The remaining factor of 11.5 can be obtained by increasing the current gain in the last stage of the current-mirror shown in FIG. 3B. The extra area required for the higher gain current-mirror is approximately 0.4 mm$^2$. Therefore, if the current design is modified for 700 mA charging, the estimated layout area will be increased to 0.56 mm$^2$, which is still smaller than that of prior reported designs.

Table II shows the final charging voltage when using different ICs to charge an 8 mAh battery. As Table II illustrates, the final charging voltage is always within 0.2% of the desired 4.2 V because it can be programmably trimmed on the chip.

TABLE II

| IC | Final Charging Voltage (V) |
| --- | --- |
| 1 | 4.193 |
| 2 | 4.202 |
| 3 | 4.196 |
| 4 | 4.206 |

It should be appreciated that although the exemplary circuits described herein have yet to be optimized for supply voltage, the circuits nevertheless achieve competitive power efficiency while consuming at least an order of magnitude less area than conventional charger circuits.

It should also be appreciated that much of the literature describing conventional charger circuits uses the maximum power efficiency during charging as a figure of merit for battery chargers. However, power efficiency is not constant during a charge, as the battery voltage varies from 3V to 4.2V. Thus, it is believed that a better figure of merit is the total energy delivered to the battery divided by the total energy consumed. Using this figure of merit, the circuits and techniques described herein achieve energy efficiency close to 70%.

The foregoing description has been directed to specific embodiments. It will be apparent, however, that variations and modifications may be made to the described embodiments, with the attainment of some or all of their advantages. For instance, it is expressly contemplated that certain components and/or elements described herein can be implemented other than as specifically shown (e.g. Wilson current mirrors). Accordingly, it is submitted that that the concepts and techniques described herein should not be limited to the described embodiments but rather should be limited only by the spirit and scope of the appended claims.

What is claimed is:

1. A battery charger circuit having first and second terminals coupled to respective terminals of a battery, the battery charger circuit comprising:

a control element having at least first and second inputs with a first one of the inputs coupled to a corresponding terminal of the battery charger circuit, said control element comprising a low-power detector circuit coupled to the first one of the inputs of said control element, said low-power detector circuit configured to sense and detect changes in a battery voltage signal, said control element configured to receive a reference voltage signal corresponding to a predetermined voltage target level of the sensed battery voltage signal at a second one of the inputs and generate a control element current signal at an output thereof in response to the sensed battery voltage signal and the reference voltage signal, said control element having an output current response characteristic which varies with respect to the sensed battery voltage signal such that said control element implements a saturating function that causes charging current provided to the first and second terminals of the battery charger circuit to automatically transition between one of: a constant current operating mode and a constant voltage operating mode; or a constant voltage operating mode to a constant current operating mode; and an end-of-charge detection circuit having at least first and second inputs with a first one of the inputs adapted to couple to the control element output, said end-of-charge detection circuit configured to receive the control element current signal at the first one of the inputs and a reference current signal at a second one of the inputs and in response thereto said end-of-charge detection circuit compares the control element current signal with the reference current signal to detect end-of-charge at the first and second terminals of the battery charger circuit, wherein said control element is implemented as an operational transconductance amplifier (OTA) and the output current response characteristic of said control element has a shape corresponding to the shape of a hyperbolic tangent function, the output response characteristic of said control element utilized to transition the charging current between the constant current operating mode and the constant voltage operating mode.

2. The battery charger circuit of claim 1 wherein said OTA is a sub-threshold (OTA) having a second input configured to receive the reference voltage signal a first input configured to receive the sensed battery voltage signal and an output coupled to an output of the battery charger circuit.

3. The battery charger circuit of claim 2 further comprising:
a current gain circuit having a first input coupled to the OTA output, a second input coupled to an output of the end-of-charge detection circuit and having an output coupled to the first and/or second terminals of the battery charger circuit, wherein the first one of the inputs of said end-of-charge detection circuit is adapted to couple to the OTA output.

4. The battery charger circuit of claim 1 wherein said OTA is an above-threshold (OTA) having a second input configured to receive the reference voltage signal, a first input configured to receive the sensed battery voltage signal and an output coupled to an output of the battery charger circuit.

5. The battery charger circuit of claim 1 further comprising a gain stage having a first input coupled to the control element output and an output coupled to a corresponding terminal of the battery charger circuit at which the charging current is provided.

6. The battery charger circuit of claim 5 wherein said end-of-charge detection circuit has an output coupled to a second input of said gain stage.

7. The battery charger circuit of claim 6 further comprising a trickle charge circuit.

8. The battery charger circuit of claim 1 wherein said control element comprises a processor configured to apply a saturation function to signals provided thereto such that the battery charger circuit automatically transitions between one of: a constant current operating mode and a constant voltage operating mode; or a constant voltage operating mode to a constant current operating mode in response to voltage levels of the sensed battery voltage signal.

9. The battery charger circuit of claim 1 wherein said control element comprises:
an analog-to-digital converter (ADC) circuit having a first input configured to receive the reference voltage signal, a second input configured to receive the sensed battery voltage signal and an output, said ADC circuit configured to receive analog signals provided thereto and to provide a digital signal at the output thereof;
a digital controller having an input coupled to the output of said ADC circuit and having an output, said digital controller configured to receive digital signals provided thereto from said ADC circuit and apply a saturation function to the digital signals such that the battery charger circuit automatically transitions between one of: a constant current operating mode and a constant voltage operating mode; or a constant voltage operating mode to a constant current operating mode in response to the digital signals provided to said digital controller; and
a digital-to analog converter (DAC) circuit having a first input configured to receive an input from said digital controller and an output, said DAC circuit configured to receive digital signals provided thereto from said digital controller and to provide an analog signal at the output thereof.

10. The battery charger circuit of claim 1 wherein in response to detecting that a predetermined threshold level of the sensed battery voltage signal is reached, the low-power detector circuit cuts off power to a load.

11. The battery charger circuit of claim 1 wherein said end-of-charge detection circuit is further configured to generate an end-of-charge signal at an output thereof in response to comparing the control element current signal with the reference current signal, wherein the end-of-charge signal controls current flow of the charging current provided to the first and second terminals of the battery charger circuit.

12. The battery charger circuit of claim 1 wherein said end-of-charge detection circuit is provided as a current comparator circuit having first and second inputs with a first one of the inputs configured to receive the control element current signal and a second one of the inputs configured to receive the reference current signal, said current comparator circuit having an output corresponding to an output of the end-of-charge detection circuit.

13. The battery charger circuit of claim 1 wherein the end-of-charge corresponds to the control element current signal being substantially less than the reference current signal.

14. The battery circuit of claim 1 wherein the battery charging current is reduced to substantially zero at or substantially near the end-of-charge.

15. The battery circuit of claim 1 wherein said control element has a third input configured to receive a bias current signal for biasing said control element, wherein the control element current signal is generated in response to the reference voltage signal, the sensed battery voltage signal and the bias current signal.

16. The battery circuit of claim 15 wherein the reference current signal is substantially the same as the bias current signal.

17. The battery circuit of claim 1 further comprising:
a reference source coupled to the second one of the inputs of said end-of-charge detection circuit, said reference source configured to generate the reference current signal.

18. The battery circuit of claim 1 further comprising:
a reference source coupled to the second one of the inputs of said control element, said reference voltage source configured to generate the reference voltage signal.

19. A power management integrated circuit (IC) having first and second terminals coupled to respective terminals of one or more rechargeable cells, the power management IC comprising:
a control element having at least first and second inputs with a first one of the inputs coupled to a corresponding terminal of the battery charger circuit, said control element comprising a low-power detector circuit coupled to the first one of the inputs of said control element, said low-power detector circuit configured to sense and detect changes in a battery voltage signal, said control element configured to receive a reference voltage signal corresponding to a predetermined voltage target level of the sensed batter voltage signal at a second one of the inputs and generate a control element current signal at an output thereof in response to the sensed battery voltage signal and the reference voltage signal, said control element having an output current response characteristic which varies with respect to the sensed battery voltage signal such that said control element provides a continuous charging current and automatically transitions from one of: a constant current operating mode to a constant voltage operating mode; or a constant voltage operating mode to a constant current operating mode;

an end-of-charge detection circuit having at least first and second inputs with a first one of the inputs adapted to couple to the control element output, said end-of-charge detection circuit configured to receive the control element current signal at the first one of the inputs and a reference current signal at a second one of the inputs and in response thereto said end-of-charge detection circuit compares the control element current signal with the reference current signal to detect end-of-charge at the first and second terminals of the power management IC; and a gain circuit having a first input coupled to the control element output, a second input coupled to the end-of-charge detection circuit output and having an output configured to couple to the first and second terminals of the power management IC, wherein said control element is implemented as an operational transconductance amplifier (OTA) and the output current response characteristic of said control element has a shape corresponding to the shape of a hyperbolic tangent function, the output response characteristic of said control element utilized to transition the charging current between the constant current operating mode and the constant voltage operating mode.

20. The power management IC of claim 19 wherein said control element comprises a processor configured to apply a saturation function to signals provided thereto such that the power management IC automatically transitions from a constant current operating mode to a constant voltage operating mode in response to voltage levels of the sensed battery voltage signal.

21. The power management IC of claim 19 wherein said control element comprises:
an analog-to-digital converter (ADC) circuit having a first input configured to receive the reference voltage signal, a second input configured to receive the battery voltage signal and an output, said ADC circuit configured to receive analog signals provided thereto and to provide a digital signal at the output thereof;
a digital controller having an input coupled to the output of said ADC circuit and having an output, said digital controller configured to receive digital signals provided thereto from said ADC circuit and apply a saturation function to the digital signals such that the battery charger circuit automatically transitions from a constant current operating mode to a constant voltage operating mode in response to the digital signals provided to said digital controller; and
a digital-to analog converter (DAC) circuit having a first input configured to receive an input from said digital controller and an output coupled to the first input of said gain circuit, said DAC circuit configured to receive digital signals provided thereto from said digital controller and to provide an analog signal at the output thereof.

22. The power management IC of claim 21 wherein in response to detecting that a predetermined threshold level of the sensed battery voltage signal is reached, the low-power detector circuit cuts off power from the one or more cells to a load.

23. The power management IC of claim 19 wherein:
said control element is provided having first and second inputs with a second one of the inputs configured to receive the reference voltage signal and a first one of the inputs configured to receive the battery voltage signal, said OTA having an output corresponding to the control element output; and
said gain circuit is provided as a current gain circuit having first and second inputs with a first one of the inputs of said current gain circuit and the first one of the inputs of said end-of-charge detection circuit coupled to the OTA output and a second one of the inputs of said current gain circuit coupled to the end-of-charge detection circuit output, said current gain circuit having an output corresponding, to the gain circuit output.

24. The power management IC of claim 23 further comprising:
a reference source coupled to the second one of the inputs of said OTA, said reference source configured to generate the reference voltage signal; and
one or more cells coupled to the first one of the inputs of said OTA.

25. A method for charging a battery with a battery charger circuit having first and second terminals coupled to respective terminals of the battery, the method comprising:
sensing and detecting changes in a battery voltage signal at a control element comprised in the battery charger circuit, said control element having at least first and second inputs with a first one of the inputs coupled to a corresponding terminal of the battery charger circuit;
comparing the sensed battery voltage signal with a reference voltage signal corresponding to a predetermined voltage target level of the sensed battery voltage signal to determine a charging current;
in response to the comparing, generating a control element current signal and providing a continuous charging current to the first and second terminals of the battery charger circuit and automatically transitioning between one of: a constant current operating mode and a constant voltage operating mode; or a constant voltage operating mode and a constant current operating mode; and
comparing the control element current signal with a reference current signal to detect end-of-charge at the first and second terminals of the battery charger circuit, wherein said control element is implemented as an operational transconductance amplifier (OTA) and the output current response characteristic of said control element has a shape corresponding to the shape of a hyperbolic tangent function, the output response characteristic of said control element utilized to transition the charging current between the constant current operating mode and the constant voltage operating mode.

26. A battery charger circuit having first and second terminals coupled to respective terminals of a battery, the battery charger circuit comprising:
a control element having at least first and second inputs with a first one of the inputs coupled to a corresponding terminal of the battery charger circuit, said control element comprising a low-power detector circuit coupled to the first one of the inputs of said control element, said low-power detector circuit configured to sense and detect changes in a battery voltage signal, said control element configured to receive a reference voltage signal corresponding to a predetermined voltage target level of the sensed battery voltage signal at a second one of the inputs and generate a control element current signal at an output thereof in response to the sensed battery voltage signal and the reference voltage signal, said control element having an output current response characteristic which varies with respect to the sensed battery voltage signal such that said control element continuously provides a charging current that transitions the first and second terminals of the battery charger circuit from one of: a constant current operating mode to a constant voltage operating mode; or a constant voltage operating mode to a constant current operating mode; and an end-of-charge detection circuit having at least first and second inputs with a first one of the inputs adapted to couple to the control element output, said end-of-charge detection circuit configured to receive the control element current signal at the first one of the inputs and a reference current signal at a second one of the inputs and in response thereto said end-of-charge detection circuit compares the control element current signal with the reference current signal to detect end-of-charge at the first and second terminals of the battery charger circuit, wherein said control element is implemented as an operational transconductance amplifier (OTA) and the output current response characteristic of said control element has a shape corresponding to the shape of a hyperbolic tangent function, the output response characteristic of said control element utilized to transition the charging current between the constant current operating mode and the constant voltage operating mode.

27. A battery charger circuit having first and second terminals coupled to respective terminals of a battery, the battery charger circuit comprising:

a control element having at least first and second inputs with a first one of the inputs coupled to a corresponding terminal of the battery charger circuit, said control element comprising a low-Dower detector circuit coupled to the first one of the inputs of said control element, said low-power detector circuit configured to sense and detect changes in a battery voltage signal, said control element configured to receive a reference voltage signal corresponding to a predetermined voltage target level of the sensed batten voltage signal at a second one of the inputs and generates a control element current signal at an output thereof in response to the sensed battery voltage signal and the reference voltage signal, said control element having an output current response characteristic corresponding to a saturating function that causes the charging current provided to the first and second terminals of the battery charger circuit to automatically transition between a constant current operating mode and a constant voltage operating mode or a constant voltage operating mode to a constant current operating mode which varies with respect to the sensed battery voltage signal; and an end-of-charge detection circuit having at least first and second inputs with a first one of the inputs adapted to couple to the control element output, said end-of-charge detection circuit configured to receive the control element current signal at the first one of the inputs and a reference current signal at a second one of the inputs and in response thereto said end-of-charge detection circuit compares the control element current signal with the reference current signal to detect end-of-charge at the first and second terminals of the battery charger circuit, wherein said control element is implemented as an operational transconductance amplifier (OTA) and the output current response characteristic of said control element has a shape corresponding to the shape of a hyperbolic tangent function, the output response characteristic of said control element utilized to transition the charging current between the constant current operating mode and the constant voltage operating mode.

28. A battery charger circuit having first and second terminals coupled to respective terminals of a battery, the battery charger circuit comprising:

a control element provided as a operational transconductance amplifier (OTA), said control element having at least first and second inputs with a first one of the inputs coupled to a corresponding terminal of the battery charger circuit, said control element configured to receive a battery voltage signal at the first one of the inputs and a reference voltage signal corresponding to a predetermined voltage target level of the battery voltage signal at a second one of the inputs and in response thereto said control element generates a control element current signal at an output thereof, said control element having an output current response characteristic which varies with respect to the battery voltage signal provided thereto such that said control element implements a saturating function that causes charging current provided to the first and second terminals of the battery charger circuit to automatically transition between one of: a constant current operating mode and a constant voltage operating mode; or a constant voltage operating mode to a constant current operating mode, wherein the output current response characteristic of said OTA has a shape corresponding to the shape of a hyperbolic tangent function, the output response characteristic of said control element utilized to transition the charging current between the constant current operating mode and the constant voltage operating mode.

* * * * *